March 10, 1964     R. P. LEVEY, JR     3,123,862
ULTRA-HIGH PRESSURE DEVICE
Filed July 24, 1962
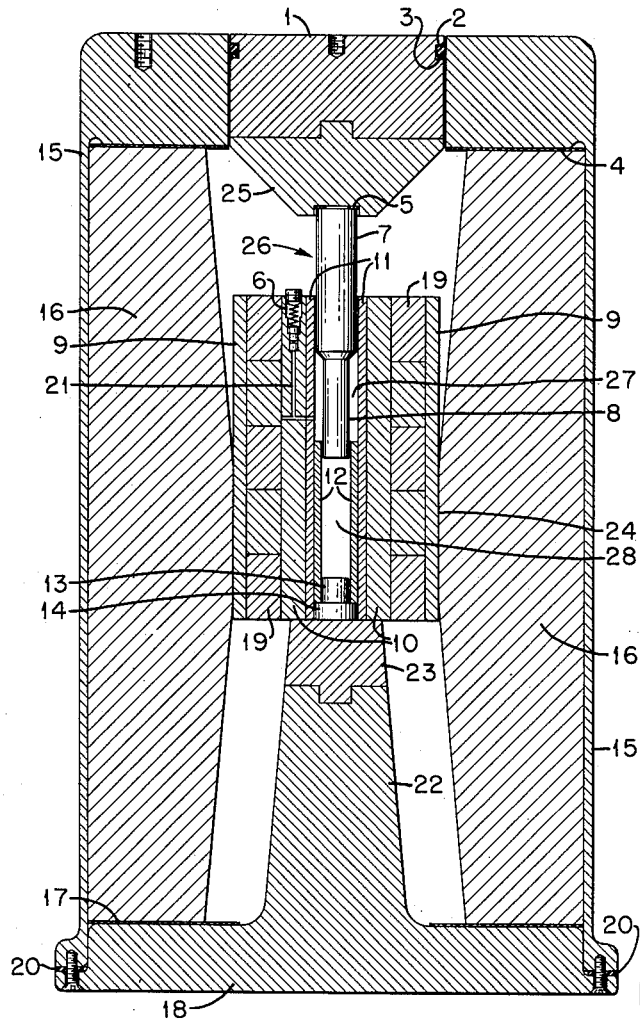
Fig. 1.
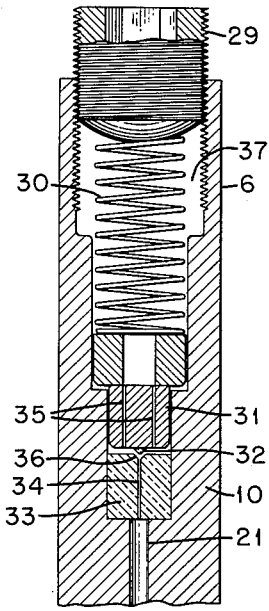
Fig. 3.
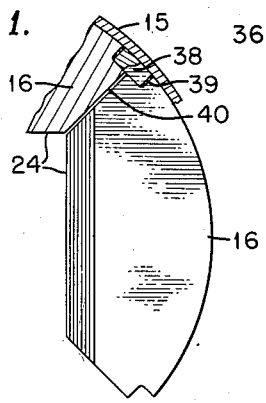
Fig. 2.
Fig. 4.
INVENTOR.
Ralph P. Levey, Jr.
BY Roland G. Anderson
ATTORNEY.

United States Patent Office 3,123,862
Patented Mar. 10, 1964

3,123,862
ULTRA-HIGH PRESSURE DEVICE
Ralph P. Levey, Jr., Oak Ridge, Tenn., assignor to the United States of America as represented by the United States Atomic Energy Commission
Filed July 24, 1962, Ser. No. 212,177
3 Claims. (Cl. 18—16)

The present invention relates to pressure intensifying devices generally and more specifically to ultra-high pressure intensifying devices whose pressure is developed by means of piston thrust.

All of the presently known apparatus used for attaining pressures greater than 1,000,000 p.s.i. require a primary source of high thrust and a geometrical advantage factor. The geometrical advantage factor employed in such devices merely means that one can apply a relatively low pressure to a large area and transmit the resultant force to a region of high pressure and small area.

In anvil-type pressure intensifying apparatus there exists the problem of obtaining isostatic pressure through a flowable transmitting media involving: yield of the medium under advancement of the anvils, maintenance of the seal between anvil members, and hydrostatic pressure transmittance. Unfortunately, good transmission media have low internal friction and are therefore poor sealants. An objectionable limitation of converging anvil-type pressure intensifying apparatus is the very small attainable volume change in a specimen during the pressing operation. The specimen volume change is a function of the distance which the anvils travel and the amount of leakage of the transmitting media between the anvils. The distance which the anvils travel is limited in such devices by the ability of the anvils to maintain the specimen chamber sealed as the pressure therein is increased. Specimens which must undergo large volume changes at high pressures cannot be pressed using anvils in the manner heretofore taught without employing a number of sequential pressing operations.

A well known embodiment of a pressure vessel comprises a cylindrical die chamber, fitted at one or both ends with pistons. When filled with a suitable fluid, the pistons may be advanced to develop any pressure that:

(1) remains within the capability of the seal;
(2) remains within the elastic limits of the pressing members.

Those trained in the art have found that with a common construction material for piston and cylinder, the annular space to be sealed between the moving parts increases with increasing isostatic pressure within the chamber. The ceiling pressure for the parts is dependent upon the strength of the construction materials. With the very finest of presently available materials and assembly technology, this pressure is less than 500,000 p.s.i. for cylinders and less than 700,000 p.s.i. for pistons larger than 0.25 inch in diameter. Methods of developing seals to 300,000 p.s.i. have been devised by those in this field. It is also noteworthy that, at the ultra-high pressures discussed herein, the allowable bending in the piston is, for all practical purposes, zero. Any bending, however slight, may be sufficient to cause failure of the piston. In the prior art, the highest pressures were obtained by making the extending portion of piston very short and the longer distances of piston travel were possible only with lower pressures.

It is therefore a general object of the invention to provide a method and apparatus for attaining isostatic pressures exceeding 1,000,000 p.s.i.

Another object of the invention is to provide an ultra-high pressure vessel having relatively extensive and uninhibited movement of its sample pressing member.

Another object of the invention is to provide a piston-cylinder type pressure vessel wherein said vessel provides its own piston and cylinder wall support.

A further object of the invention is to provide a piston-cylinder type pressure vessel wherein said vessel possesses a self-contained and self-actuatable sealing means between said piston and said cylinder.

Other objects of the invention will become apparent from an examination of the following description of the invention and the appended drawings, wherein:

FIG. 1 is a transverse sectional view of a preferred embodiment of the subject invention.

FIG. 2 is an end view of one of the 4 anvil members 16.

FIG. 3 is an enlarged detailed sectional view of the pressure regulating valve 6.

FIG. 4 is a greatly enlarged sectional view of part of valve 6 showing the conical diamond closure member 32 in abutting relationship with conically contoured sapphire crystal valve seat 36.

In accordance with the present invention, a device for attaining isostatic pressures exceeding 1,000,000 p.s.i. is provided which comprises in combination; a cylindrical hollow housing means, a plurality of anvil members encased by said hollow housing, a multi-sided die member having a stepped interior pressure chamber and converged upon by said plurality of anvil members, opposing piston members positioned in said chamber, at least one of said pistons being stepped and movable within said chamber, pressure means providing lateral support to the reduced diameter portion of said movable piston when said piston is extending out of said pressure chamber and under compressive stress, and a pressure relieving means to regulate the maximum lateral support of said movable piston.

As discussed above, the pressure ceiling for fluid containing vessels in present art is about 300,000 p.s.i. This new development incorporates lateral fluid support for both piston and cylinder. The support is such that the piston-cylinder seal load is substantially constant. The fluid support to the cylinder is derived through anvil intensifiers driven by the primary (low pressure) fluid. The piston support is derived from an intermediate fluid by one of several means preferably the relief valve principle. It is emphasized that the 1,000,000 p.s.i. working pressure limit is presently imposed by equipment limitation in primary oil pressure. The apparatus herein described using present day steels and with minor modification, can be shown by conservative computations to be capable of 1,500,000 p.s.i.

To facilitate an understanding of the invention, reference is made to FIG. 1 of the accompanying drawings wherein a preferred embodiment of the invention is illustrated. The preferred embodiment comprises a housing 15 generally cylindrical in form, having its bottom end open and its top end closed except for a centrally disposed circular opening therein. For closing the bottom of housing 15, a circular base plate 18 is provided. A neoprene gasket 20 provides a seal between housing 15 and base plate 18. The base plate has an upwardly extending post 22 in its centermost part, atop which is fitted a hard metal support block 23. Housing 15, in cooperation with base plate 18, encases a group of four anvil members 16 (only two shown). Anvil members 16 are generally truncated longitudinal quadrants of a right circular cylinder. The truncated surface of each anvil has two longitudinally tapered portions and a non-tapered portion, the non-tapered portion of the truncated surface defining a planar rectangular surface 24. The tapered portions are each inclined by about 5° with respect to the non-tapered portion and extend from each end of the anvil partway to its center. In end view each anvil has the configuration shown in FIG. 2. Channels are provided along the outer edges of the anvils to accommodate a bar 38, and Teflon shims 39. The bar 38 and shims 39 maintain a spacing 40 between the sides of adjacent anvils which minimizes any interference between anvils as they exert a thrust on the central die member. The four anvils are fitted around the inner periphery of housing 15 with their planar rectangular surfaces contacting the four exterior sides of die member 9. Die member 9 is provided with a longitudinal cylindrical opening into which is press-fitted a multiplicity of vertically stacked annular rings 19. A hollow cylinder 10, having provided therein a pressure relief valve 6 and a passageway 21, is press-fitted into the cylindrical cavity defined by the interior surfaces of annular rings 19. Press fitted inside first cylinder 10 is a second hollow cylinder 11. Passageway 21 also passes through cylinder 11 thereby providing communication between valve 6 and the annular chamber 27. Hollow cylinders 10 and 11 are at least and preferably the same length as die member 9. Press fitted into hollow cylinder 11 is a third cylinder 12 somewhat shorter (about ½ as long) then second cylinder 11. Third cylinder 12 extends to the approximate bottom of second cylinder 11 where it contacts a sapphire closure member 14 fitted into the bottom of second cylinder 11 and having a reduced diameter section 13 extending into the lower interior region of third cylinder 12 to effect closure thereof. Nested cylinders 10, 11, and 12 and closure member 14 are supported between anvils 16 by support block 23.

An alternate die assembly would resemble the above described assembly except that the rectangular die member 9 and the vertically stacked annular rings 19, would be replaced with a single piece die member having the external dimensions of die member 9 and an axial cylindrical cavity identical to the cavity formed by annular rings 19.

A slidable plug 1 is sealably inserted within the circular opening in the top of housing 15. An O-ring 2 and a back up ring 3 provide the necessary sealing for plug 1 without significantly restraining the movement thereof during a pressing operation. Firmly affixed thereto and descending from plug 1 is a conical frustum 25, the base of said frustum being that part of said frustum which contacts plug 1. The apex of said frustum 25 is provided with an indentation into which is recieved a piston assembly 26. Piston assembly 26 is provided with a reduced-diameter portion 8 and a portion 7 of a larger diameter. In the preferred embodiment, said piston assembly 26 comprises two solid right circular cylinders, one 7 of a larger diameter and slidably mating in cylinder 11 and one 8 of a smaller diameter and slidably mating in cylinder 12. As spoken of herein, the two cylinders are considered a single entity, designated as piston assembly 26, having a reduced diameter portion 8 and a larger diameter portion 7. In the preferred embodiment, the reduced-diameter portion 8 of piston asesmbly 26 is approximately equal in length to the third cylinder 12 so that, if desired, the piston may be moved into cylinder 12 a maximum distance. The diameters of piston assembly 26 are chosen to fit snugly, but slidably, within cylinders 11 and 12, as stated, with small-diameter portion 8 fitting into cylinder 12 and large-diameter portion 7 fitting into cylinder 11.

Bearing rings 4 and 17 of Teflon are provided between anvils 16 and the top of housing 15 and between anvils 16 and base 18. The Teflon acts to prevent sticking and/or galling of the anvils bearing on housing 15 and base 18 during pressing operations. A copper shim 5 is provided between piston assembly 26 and frustum 25 for the purpose of equalizing the distribution of the forces acting on frustum 25.

FIG. 1 shows piston assembly 26 in the withdrawn position. In such position the reduced diameter portion 8 of piston assembly 26 forms an annulus 27 between itself and cylinder 11. FIG. 1 also shows the specimen chamber 28 whose perimeter is defined by closure member 14, reduced diameter portion 8 of piston assembly 26, and the interior wall of cylinder 12.

FIG. 3 shows the pressure regulating valve 6 in detail. Valve 6 comprises a housing 10 into which is fitted, in axial alignment, a zero-degree oriented sapphire crystal valve seat member 33, having therein a conically contoured valve seat 36 which is also axially aligned. A cylindrical passageway 34 is provided in valve seat member 33 along the "C" axis thereof, said passageway 34 communicating between the high pressure oil of passageway 21 and the apex of conical valve seat 36. Conical diamond closure member 32 is rigidly mounted to closure support 31 which is slidably fitted in housing 10. Closure support 31 is also axially aligned in housing 10 and maintains closure member 32 in axial alignment with valve seat 36. Closure member 32 is preferably constructed of diamond because this component and the sapphire valve seat will be required to withstand differential pressures up to 500,000 p.s.i. and the eroding effects of escaping oil. Passageways 35 conduct the oil released by the valve through the closure support 31 into the low pressure cavity 37. Closure member 32 is urged into contact with valve seat 36 by spring means 30 acting on closure support 31. Spring means 30 is maintained at a selected value of compression by a socket head set screw 29 threadably mounted in housing 10.

FIG. 4 shows a greatly enlarged view of the conical diamond closure member 32 in abutting relationship with the conically contoured sapphire-crystal valve seat 36. The abutting or closed position exists whenever the pressure in passageway 34 is less than the preselected value at which valve 6 relieves.

Two alternate means for maintaining the desired pressure in annular chamber 27 have been conceived by the inventor. In both alternate systems the valve is omitted and a system of external pistons, cylinders and oil filled chambers acts to maintain the desired pressure in chamber 27. One alternate form utilizes a capillary tube in enlarged diameter portion 7 of piston assembly 26 as the connection between the external and internal systems. Another alternate form provides a sleeve encompassing enlarged diameter portion 7, said sleeve transferring pressure from an external system to the internal system while allowing enlarged diameter portion 7 of piston assembly 26 to move freely within said sleeve.

As a further illustration of the invention, the following example is offered:

*Example*

In a typical pressing operation employing the preferred embodiment described herein, with plug 1 and piston assembly 26 removed, a specimen is placed in chamber 28 and the remainder of the specimen chamber is filled with a pressure transmitting medium such as oil or water. Piston assembly 26 is then positioned in cylinders 11 and 12 and annulus 27 is filled with a pressure transmitting medium. Filling may be accomplished by inserting the small diameter portion 8 of piston assembly 26 partway into cylinder 12, admitting the fluid, and next inserting the larger diameter portion 7 of piston assembly 26 into cylinder 11. Valve 6 is set to relieve at approximately 500,000 p.s.i. Plug 1 is inserted and the assembly is placed in a lower pressure isostatic pressure vessel. The magnitude of the externally applied isostatic pressure and the duration of its application is determined by the type of specimen and the results desired. Disassembly is effected in essentially the reverse order of assembly.

During the pressing operation the novel features of the subject device are most evident. Referring to FIG. 1, when an external isostatic pressure is applied to the assembly, the same pressure is experienced by its entire outer surface. The maximum external pressure contemplated is 40,000 p.s.i. By design, the only external parts of the assembly which can move under 40,000 p.s.i. isostatic pressure are the side walls and plug 1. The side walls can be moved only slightly, their slight movement being experienced by anvils 16 which in turn converge upon die member 9. It is desired that die member 9 and its fitted cylinders 10, 11, and 12 be compressed by anvils 16 to provide lateral support during a pressing operation where the internal pressure in the sample chamber 28 becomes very high. With such lateral support the cylindrical walls of the sample pressing chamber can be prevented from growing radially away from the reduced diameter portion 8 of piston assembly 26. By preventing radial growth of the chamber walls the close tolerances between the reduced diameter portion 8 of piston 26 and cylinder 12 necessary for a complete seal at the pressures of interest, can be maintained. It should be noted that the anvils 16 provide a varying amount of support depending on the external isostatic pressure. This support varies in the same manner as the pressure in the sample pressing chamber as both the anvils and the piston assembly 26 derive their pressing force from the external isostatic pressure. The lateral support provided by the anvils can thus be considered to be tailored to the support requirements of the cylinder wall in maintaining a seal. The inventor, in designing the subject device, tapered the anvils 16 to provide a geometrical advantage factor which in effect increases the 40,000 p.s.i. external isostatic pressure to 350,000 p.s.i., a value capable of compressing die member 9 by the desired amount.

Movement of plug 1 under the effect of the external isostatic pressure causes piston assembly 26 to progress further into cylinders 11 and 12, a gradual increase in external isostatic pressure causing gradual progression of the piston. As the reduced diameter portion 8 of piston assembly 26 progresses into chamber 28, the volume therein is decreased and the pressure therein increased. Since the pressure transmitting medium in chamber 28 is a fluid having isotropic properties in the pressure range of interest, any pressure generated therein will be isostatic and so experienced by any specimen in chamber 28. Simultaneous with the increase in pressure in chamber 28, the annular space 27 is also being reduced in volume and the pressure therein is increasing and will continue to increase with piston movement until it reaches the value at which valve 6 relieves. Further movement of the piston, as pertaining to the pressure in annulus 27, only serves to cause valve 6 to relieve. It is thus, that sufficient pressure is generated and held in annulus 27 to provide the lateral support necessary to prevent the reduced diameter portion 8 of piston assembly 26 from being crushed as its compressive strength is exceeded in the axial direction and yet not inhibit progression of the piston in cylinder 12. An additional benefit of the high pressure generated in annulus 27 is that it lowers the pressure drop across the seal between cylinder 12 and reduced diameter portion 8 of piston assembly 26.

The above description of one form of the invention was offered for illustrative purposes only, and should not be interpreted in a limiting sense. It is intended that the invention be limited only by the claims appended hereto.

Having thus described my invention I claim:

1. In a piston-cylinder type pressure vessel comprising a multi-sided female die member having a stepped cylindrical interior wall defining larger and smaller diameter cavities, a closure member fitted into one end of said die member, and a movable stepped cylindrical piston mounted to enter through the other end of said die member, the reduced diameter end of said piston defining a first pressure chamber within said smaller diameter cavity when said end extends thereinto, said first chamber being adapted to receive a specimen to be pressed and a pressure transmitting medium, the improved means for providing lateral piston and cylinder wall support, enabling the attainment of isostatic pressures in excess of 1,000,000 p.s.i. within said first chamber, while permitting relatively extensive and uninhibited movement of said piston, comprising a hollow cylindrical housing providing with an inwardly extending, thickened flange at its upper end, a plurality of anvil intensifiers cooperatively converging upon the outer sides of said die member and bearing against said die member and the inside wall of said housing, said anvils providing lateral support for said sides of said die member, a base plate affixed to the bottom of said housing, a central post extending upward from said base plate and supporting said die member and said closure member, a slidable plug forming a seal within said flange, said slidable plug contacting the larger diameter end of said piston to impart motion thereto in response to an external actuating isostatic pressure, said reduced diameter portion of said piston and said larger diameter portion of said stepped cylindrical cavity defining a second, annular pressure chamber, means of relieving pressure within said second pressure chamber, said pressure relieving means relieving the pressure within said second pressure chamber at a preselected value, and a substantially incompressible fluid disposed within said second chamber, said fluid in said second pressure chamber providing lateral support for the reduced diameter portion of said piston, said external actuating isostatic pressure acting on the entire outer surface of said housing, base plate and slidable plug during a pressing operation, said external pressure acting on said anvils through said cylindrical housing to maintain a substantially complete seal between said die member, closure member and piston during said pressing operation.

2. In a piston-cylinder type pressure vessel comprising a multi-sided female die member having a stepped cylindrical interior wall defining larger and smaller diameter cavities, a closure member fitted into one end of said die member, and a movable, stepped cylindrical piston mounted to enter through the other end of said die member, the reduced diameter end of said piston defining a first pressure chamber within said smaller diameter cavity when said end extends thereinto, said first chamber being adapted to receive a specimen to be pressed and a pressure transmitting medium, the improved means for providing piston and cylinder wall support, enabling the attainment of isostatic pressures in excess of 1,000,000 p.s.i. within said first chamber, while permitting relatively extensive and uninhibited movement of said piston, comprising a hollow cylindrical housing provided with an inwardly extending, thickened flange at its upper end, a plurality of anvil intensifiers cooperatively converging upon the outer sides of said die member and bearing against said die member and the inside wall of said housing, said anvils providing lateral support for said sides of said die member, a base plate affixed to the bottom of said housing, a central post extending upward from said base plate and supporting said die member and said closure member, a slidable plug forming a seal within said flange, said slidable plug contacting the larger diameter end of said piston to impart motion thereto in response to an external actuating isostaic pressure, said reduced diameter portion of said piston and said larger diameter portion of said stepped cylindrical cavity defining a second, annular pressure chamber, a pressure relief valve, a passageway communicating between said relief valve and said second pressure chamber, said relief valve relieving the pressure within said second pressure chamber at a preselected value, a substantially incompressible fluid disposed within said second chamber, said fluid in said second pressure chamber providing lateral support for the reduced diameter portion of said piston, said external actuating isostatic pressure acting on the entire outer surface of said housing, base plate and slidable plug during a pressing operation, said external pressure acting on said anvils through said cylindrical housing to maintain a substantially complete seal between said die member, closure member and piston during said pressing operation.

3. In a piston-cylinder type vessel for pressing comprising a multi-sided female die member having a stepped cylindrical interior wall defining larger and smaller diameter cavities, a closure member fitted into one end of said die member, and a movable, stepped cylindrical piston extending through the other end of said member, the reduced diameter end of said piston defining a first pressure chamber within said smaller diameter cavity, said first pressure chamber being adapted to receive a specimen to be pressed and a pressure transmitting medium, improved means for providing piston and cylinder wall support while permitting relatively extensive and uninhibited movement of said piston, comprising; a hollow cylindrical housing for receiving equal pressure on all surfaces, a plurality of anvil intensifiers disposed within said housing, having external surfaces contacting the side walls of said housing, and cooperatively converging upon the outer walls of said female die member to provide lateral support to said die member, a slidable plug mounted at one end of and forming a part of the external surface of said housing, said slidable plug contacting the larger diameter end of said piston to impart thrust thereto, said reduced diameter portion of said piston and said larger diameter portion of said stepped cylindrical cavity defining a second, annular pressure chamber, means for relieving pressure within said second pressure chamber, and a substantially incompressible fluid disposed within said second chamber to provide lateral support, during a pressing operation, for the reduced diameter portion of said piston.

References Cited in the file of this patent

UNITED STATES PATENTS

| | | |
|---|---|---|
| 650,755 | Huber | May 29, 1900 |
| 701,549 | Deering | June 3, 1902 |
| 1,782,103 | Solberg et al. | Nov. 18, 1930 |
| 2,745,713 | Suits | May 15, 1956 |
| 2,786,410 | Bakewell | Mar. 26, 1957 |